United States Patent [19]

Matsuno

[11] Patent Number: 5,613,211
[45] Date of Patent: Mar. 18, 1997

[54] METHOD OF ESTABLISHING INTER BASE-STATION SYNCHRONIZATION AND MOBILE RADIO COMMUNICATON SYSTEM USING THE METHOD

[75] Inventor: Keishi Matsuno, Tokyo, Japan

[73] Assignee: Nippon Steel Corporation, Tokyo, Japan

[21] Appl. No.: 243,622

[22] Filed: May 16, 1994

Related U.S. Application Data

[63] Continuation-in-part of Ser. No. 132,247, Oct. 6, 1993.

[30] Foreign Application Priority Data

| Oct. 7, 1992 | [JP] | Japan | 4-293696 |
| Dec. 25, 1992 | [JP] | Japan | 4-359474 |
| Mar. 14, 1994 | [JP] | Japan | 6-069040 |

[51] Int. Cl.$^6$ ................................................ H04B 7/26
[52] U.S. Cl. ................ 455/51.1; 455/56.1; 455/58.1; 455/67.6; 370/350; 375/356
[58] Field of Search ............................ 370/100.1, 103, 370/105; 375/354, 356, 355; 455/58.1, 51.1, 51.2, 56.1, 67.1, 67.6

[56] References Cited

U.S. PATENT DOCUMENTS

| 4,718,109 | 1/1988 | Breeden et al. . | |
| 4,837,850 | 6/1989 | Maisel et al. | 455/58.1 |
| 4,939,752 | 7/1990 | Literati et al. | 455/51.1 |
| 5,388,102 | 2/1995 | Griffith et al. | 375/356 |
| 5,404,575 | 4/1995 | Lehto | 455/51.1 |
| 5,448,570 | 9/1995 | Toda et al. | 370/103 |

FOREIGN PATENT DOCUMENTS

| 0197556 | 10/1986 | European Pat. Off. . | |
| 2844400 | 5/1980 | Germany | 455/51.1 |
| 0042995 | 2/1991 | Japan | 455/51.1 |
| 2241411 | 8/1991 | United Kingdom . | |

OTHER PUBLICATIONS

Autonomous Inter–base–station Synchronization for TDMA Microcellular Systems, Akaiwa et al., The Institute of Electronic Information Communication Engineers in Japan, National Spring Meeting, 1991 B–334.

Improved Scheme of Autonomous Inter–base–station Synchronization, Akaiwa et al., "The Institute of Electronic Information Communication Engineers in Japan", National Autumn Meeting, 1991 B–251.

(List continued on next page.)

*Primary Examiner*—Reinhard J. Eisenzopf
*Assistant Examiner*—Nguyen Vo
*Attorney, Agent, or Firm*—Pollock, Vande Sande & Priddy

[57] ABSTRACT

A method for establishing inter-base-station synchronization among a plurality of radio base stations of a mobile radio communication system. Each radio base station transmits a radio frequency control signal including priority information identifying the priority of the transmitting station as it relates to establishing synchronization, and synchronization establishing information indicating whether synchronization has been previously established between the transmitting base station and any other radio base station. The receiving radio base station synchronizes with the transmitting base station if the receiving base station has not previously established synchronization, and based on the priority information contained in the received radio frequency control signal, the receiving station is determined to be allowed to establish synchronization with the transmitting base station, and further if the synchronization establishing information contained in the control signal indicates that the transmitting base station has previously been synchronized. Once the receiving base station synchronizes with the transmitting base station, the priority of the receiving base station is changed to be equal to the priority of the transmitting base station.

30 Claims, 8 Drawing Sheets

OTHER PUBLICATIONS

Transmitter Power Control Effect on Autonomous Reuse Partitioning, The Institute of Electronic Information Communication Engineers in Japan, Spring Meeting 1992, B–319.

Exact Radio Link Design in Cellular Mobile Communication Systems, Transactions of the Institute of Electronics and Information communication Engineers in Japan (B), J71–B, No. 5, May 1988, pp. 633–639.

Autonomous Decentralized Inter–base–station Synchronization for TDMA Microcellular Systems, Akaiwa et al., IEEE 1991, pp. 257–262.

Autonomous Time Synchronization Among Radio Ports in Wireless Personal Communications, Justin C–I Chuang, IEEE May 1993, pp. 700–705.

METHOD OF ESTABLISHING INTER BASE-STATION SYNCHRONIZATION AND MOBILE RADIO COMMUNICATON SYSTEM USING THE METHOD

CROSS-REFERENCE TO RELATED APPLICATION

This application is a continuation-in-part of U.S. patent application Ser. No. 08/132,247 filed on Oct. 6, 1993, the contents of which are incorporated herein by reference.

BACKGROUND OF THE INVENTION

1. Field of the Invention

The present invention relates to a method of establishing synchronization among a plurality of radio base stations forming a mobile radio communication system operated in a time division multiple access (TDMA) mode, a code division multiple access (CDMA) mode or the like and a mobile radio communication system using this method.

2. Description of the Related Art

In a mobile radio communication system, effective utilization of frequencies is achieved by adopting a cellular system in which the same frequency is allocated to a plurality of radio communication stations covering remoted cells. Further, various types of systems for narrow-band transmission using signal compression and modulation-demodulation techniques are being studied, and utilization of a half rate of an audio codec is also studied in a digital system.

In such a situation, as a countermeasure to an increase of traffic, it is proposed in a mobile radio communication system, in particular in a mobile telephone system for automobiles, to gradually reduce service zones of respective radio base stations forming conventional large or medium zones, e.g., to zones each having a radius of 5 Km to 3 Km. The effective utilization of frequencies by forming smaller zones is useful especially in a personal radio communication system which is planned to be put into practical use. In this personal radio communication system, a small zone system is studied in which each zone has an area of several hundred meters to several ten meters in the radius which is called a microcell or a picocell, as disclosed in the Transactions of the Institute of Electronics and Information Communication Engineers in Japan (B), J71-B, No. 5, May 1988 pp. 633–639.

In such a small zone system, the number of radio base stations becomes very large sometimes. Thus, it is planned to install these radio base stations on utility poles, building walls or the like. In this case, it is necessary to make the radio base station much more compact in size and lighter in weight, as well as to reduce the cost thereof. In such a small zone system, especially under free sale circumstances of the terminals (mobile stations) including radio base stations, many radio base stations will be increased successively in order to cope with high traffic. This will result in the following problems.

Namely, when many radio base stations are installed successively, it is expected to form what is called a multizone where zones of adjacent radio base stations overlap with each other so that the radiowave transmitted from a radio base station can be received directly by another adjacent radio base station. In such a multizone, probability of loss in telephone communication is increased with the increase of interference by an adjacent radio base station, and calling becomes impossible at the worst. When a TDMA system is adopted in such a multizone, it is required to establish synchronization between frames used by respective radio base stations provided in contiguous zones forming a multizone, in order to assure functions of detecting and/or avoiding interference, that is, to cause the radio base station in each zone to perform telephone communication with a mobile station located in that zone at the same frame timing as that at which the adjacent base station performs its telephone communication, as disclosed, for example, in "Autonomous Decentralized Inter-Base-Station Synchronization for TDMA Microcelular Systems" Akaiwa et al IEEE 1991 pp. 257–262. As to the necessity of synchronization between radio base stations, it has been reported that the efficiency in using the slots is lowered by 25% to 30% in an asynchronous condition as compared with that in a synchronous condition. Namely, this is because, when such an interference is generated in one zone, it happens sometimes that an unused vacant channel is mistaken as an used channel by noises due to the interference caused by drift of the frame timing, thus preventing the vacant channel from being used.

When it is intended to realize synchronization between the adjacent radio base stations based on the control from a higher rank exchange like a telephone system for automobiles, the following problems are caused. Firstly, many control signal lines are required for connecting each of the radio base stations with the exchange, thus causing a rise of the cost of equipment. Secondly, a large-sized computer coping with a large load for synchronization is necessary in the exchange side, and hardware for establishing synchronization is also necessary in the side of each radio base station, thus also causing a rise of the cost of equipment. Thirdly, in the case of a personal handy phone "PHP" system, the following problems are caused.

Namely, the PHP is applied to indoor mobile terminals in offices or homes and outdoor mobile terminals for public telephone communication. In offices, a business cordless telephone system called a behind PBX is introduced and the synchronization among respective radio base stations is established based on a command from the PBX. In this case, it is necessary to make the control signal common to the business cordless telephone system and the PHP system for synchronization between the radio base stations thereof and hence complicated processing is required every time a new radio base station is installed.

Further, since a plurality of communication enterprises use switching systems having different specifications sometimes in railway stations, airports or the like, complicated adjustment work requiring time and labor is necessary to unify specifications relating to synchronization control among respective switching systems.

It is desired to provide a method of establishing inter-base-station synchronization capable of performing processing of establishment of inter-base-station synchronization only by autonomous control of respective radio base stations without depending on the control by a higher rank station, thereby to reduce a burden of the higher rank station and a mobile radio communication system using this method.

SUMMARY OF THE INVENTION

It is an object of the present invention to provide a method of establishing inter-base-station synchronization in a mobile radio communication system having a plurality of base stations forming a multizone, by autonomous-control of respective base stations without relying on the control by a higher rank station. The burden of the higher rank station is reduced in order to solve various problems, as mentioned above, in synchronizing radio base stations in a mobile radio communication system and a mobile radio communication system using the method.

According to the present invention, a method of establishing synchronization among a plurality of radio base stations forming a mobile radio communication system comprises the steps of: transmitting from a radio base station a control signal including priority information indicating priority of its station relating to synchronization and synchronization establishing information indicating whether synchronization has been established between the base station and any other one of the radio base stations or not; and establishing, in each of the radio base stations, which has received the control signal from another radio base station referred to as a transmitting base station synchronization with the transmitting base station, and also altering the priority of the base station to conforms to the priority of the transmitting base station when the transmitting base station is a radio base station with which the base station is allowed to establish synchronization based on priority information included in the control signal, and when synchronization has been previously established in the transmitting base station based on the synchronization establishing information.

With the structure described above, each of the radio base stations transmits the priority information relating to synchronization and the synchronization establishing information indicating whether synchronization has been established between the base station and another radio base station, by including it in the control signal. When a radio base station, in which synchronization has not been established as yet, receives the control signal, the receiving base station determines whether the transmitting radio base station which has transmitted the control signal is a station with which it is allowed to establish synchronization based on the priority information, and also determines whether the transmitting base station has previously established synchronization based on the synchronization establishing information included in the received control signal. Then, when the transmitting base station is allowed to establish synchronization, and has already established synchronization, synchronization is established between the receiving base station and the transmitting base station. In such a manner, each of the radio base stations is able to establish the mutual synchronization by autonomous-control without relying on a higher rank station. Thus, by renewing the degree of the priority of the radio base station which has received the control signal to the same degree as that of the radio base station which has transmitted the control signal, the priorities of both the radio base stations are made equal to each other. By using this system when a new radio base station is installed so as to form a multizone with an old radio base station which has already established synchronization, and applying to the new radio base station a lower priority than that of the old radio base station, it is possible to make the priorities of the radio base stations equal to each other upon establishing synchronization between both the base stations. Therefore, when new radio base stations are installed one after another, each new base station takes over the priority of the preceding base station, resulting in the priorities of all the base stations forming a multizone become equal to each other.

According to one aspect of the present invention, in a mobile radio communication system comprising a plurality of radio base stations, each performing radio communication with a mobile station in the zone of the base station, each of the radio base stations comprises: means for including, in a control signal transmitted from the base station, priority information indicating a priority of the radio base station relating to the establishment of synchronization and synchronization establishing information indicating whether synchronization has been already established between the radio base station and any other one of the radio base stations; priority determining means operative, when a control signal is received from another radio base station, which is a transmitting base station, and when synchronization has not been established as yet in the radio base station, for determining whether the transmitting base station is one with which it is allowed to establish synchronization based on the priority information included in the control signal; synchronization establishment determining means for determining whether synchronization has been previously established in the transmitting base station based on the synchronization establishing information; synchronization establishing means operative, when it is determined that the transmitting base station is a radio base station with which it is allowed to establish synchronization and synchronization has been established with the transmitting base station, for establishing synchronization between the radio base station and the transmitting base station; and priority renewing means operative, when synchronization is established by the synchronization establishing means, for setting a new priority of the radio base station to the priority of the transmitting base station.

With the structure described above, in a mobile radio communication system according to the present invention, each of the radio base stations transmits priority information relating to establishment of synchronization and priority establishing information indicating whether synchronization has been established between the radio base station and any one of radio base stations in a control signal. A radio base station, which has received the control signal, determines whether the radio base station (transmitting station) which has transmitted the control signal is a station with which it is allowed to establish synchronization by the priority determining means. When the transmitting station is a station with which it is allowed to establish synchronization, it determines whether the transmitting station has previously established synchronization based on the synchronization establishing information included in the received control signal by the synchronization establishing means, and when it is determined that the transmitting station has established synchronization, synchronization is established with the transmitting station. Further, by using a system of renewing the priority of the radio base station to the same priority as that of the transmitting station by the priority renewing means, when a new radio base station is installed so as to form a multizone with an old radio base station which has previously established synchronization, it is possible to make the priority of the new radio base station equal to the priority of the old radio base station by applying to the new base station a priority lower than that of the old base station.

According to another aspect of the present invention, in a mobile radio communication system comprising a plurality of radio base stations, each performing radio communication with a mobile station in its zone of the own radio base station, the plurality of radio base stations comprises: a first radio base station for repeatedly transmitting a first radio signal including priority information relating to synchronization at a predetermined time interval; and a second radio base station for receiving one of the first radio signals transmitted by the first radio base station, and transmitting a second radio signal synchronized with a next one of the first radio signals transmitted by the first radio base station and including priority information indicating the same priority as that of the first radio base station.

In a mobile radio communication system having the structure described above, when the second radio base station has established synchronization with the first radio base station, the second radio signal transmitted by the second radio base station includes synchronization establishing information indicating that the second radio base station has already established synchronization and priority information indicating the same priority as that of the first radio base station. Thus, another radio base station receiving the second radio signal can establish synchronization with the second radio base station based on the second radio signal.

According to further aspect of the present invention, in a mobile radio communication system including a plurality of radio base stations, each of the radio base stations comprises: means for including, in a control signal transmitted by the radio base station, priority information indicating a priority of the radio base station relating to establishment of synchronization and synchronization establishing information indicating whether synchronization has been already established between the radio base station and any other one of the radio base stations; priority determining means operative, when synchronization has not been established between the radio base station and any other one of the radio base stations, for determining, based on priority information included in a control signal received from another radio base station, whether a priority of the transmitting base station indicates that the radio base station is allowed to establish synchronization therewith; means for executing synchronization with the transmitting base station when the synchronization establishing information indicates that synchronization has been previously established and the priority of the transmitting radio base station indicates that the radio base station is allowed to establish synchronization therewith; and means operative, when synchronization is effected with the transmitting base station, for making a priority of the radio base station equal to the priority of the transmitting base station and including priority information to indicate priority in the control signal.

In a mobile radio communication system having the structure described above, respective radio base stations transmit and receive the control signal including priority information and synchronization establishing information to/from an adjacent radio base station by the means for including priority information and synchronization establishing information. In a radio base station which has received the control signal and not yet established synchronization, it is determined whether the radio base station (transmitting station) which has transmitted the control signal is a station with which the receiving station is allowed to establish synchronization based on priority information by the priority determining means. When the transmitting station is a station with which the receiving station is allowed to establish synchronization, it is determined whether the transmitting station has already established synchronization based on synchronization establishing information included in the received control signal by the means, for executing synchronization, and, when the transmitting station has already established synchronization, the receiving station executes synchronization with the transmitting station. When synchronized with the transmitting station, the priority of the receiving station is set to the same priority as that of the transmitting station, and this fact is included in the control signal transmitted by the receiving radio base station.

According to another further aspect of the present invention, in a mobile radio communication system having a plurality of radio base stations, each performing radio communication with a mobile station in the zone of its own radio base station, each of the radio base stations comprises: transmitting means for transmitting a control signal including synchronization establishing information indicating whether synchronization has been established between the radio base station and any other one of the radio base stations, and priority information indicating a priority relating to establishment of synchronization; receiving means for receiving the control signal transmitted by the transmitting means of another radio base station acting as a transmitting base station; priority determining means for determining whether the transmitting base station is a radio base station with which the receiving base station is allowed to establish synchronization based on the priority information included in the control signal received by the receiving means; synchronization determining means for determining whether the transmitting base station has already established synchronization based on the synchronization establishing information included in the control signal; synchronization establishing means operative, when it is determined that the receiving base station is allowed to establish synchronization with the transmitting base station and that the transmitting base station has already established synchronization, for establishing synchronization between the receiving radio base station and the transmitting base station; and priority renewing means operative, when the synchronization is established, for renewing a priority of the receiving radio base station to a priority equal to that of the transmitting base station.

In a mobile radio communication system having the structure described above, each base station can determine whether any other base station has already established synchronization based on the synchronization establishing information included in the control signal transmitted by radio among the radio base stations. The synchronization establishing means determines whether synchronization is to be executed with the other base station based on the result of the above determination, and each base station executes synchronization based on the control signal when it is determined that synchronization is to be executed.

According to the present invention, in a synchronizing system for executing synchronization between a first radio base station and a second radio base station both forming a mobile radio communication system, each of the first and second radio base stations comprises: transmitting means for transmitting a signal including priority information of the radio base station; receiving means for receiving a signal transmitted by transmitting means of the other base station; comparing means for comparing priority information included in the signal of the other base station received by the receiving means with priority information of the radio base station; synchronizing means for causing the signal to be transmitted from the radio base station to synchronize with the signal of the other base station based on a result of the comparison by the comparing means; and priority changing means for changing a priority of the radio base station according to priority information of the other base station with which it is synchronized by the synchronizing means.

In a synchronizing system having the structure described above, since each of the radio base stations compares the priority information of the other base station with its priority information by the comparing means and determines whether it is to be synchronized with the other base station based on the result of the comparison, it is possible to perform synchronization autonomously without control from a higher rank station. Further, when each radio base station has established synchronization with the other base station, the priority of the radio base station is changed to the priority of the other station by the priority changing means. Thus, all of the radio base stations as synchronized have the same priority.

DESCRIPTION OF THE PREFERRED EMBODIMENTS

Figure 1:
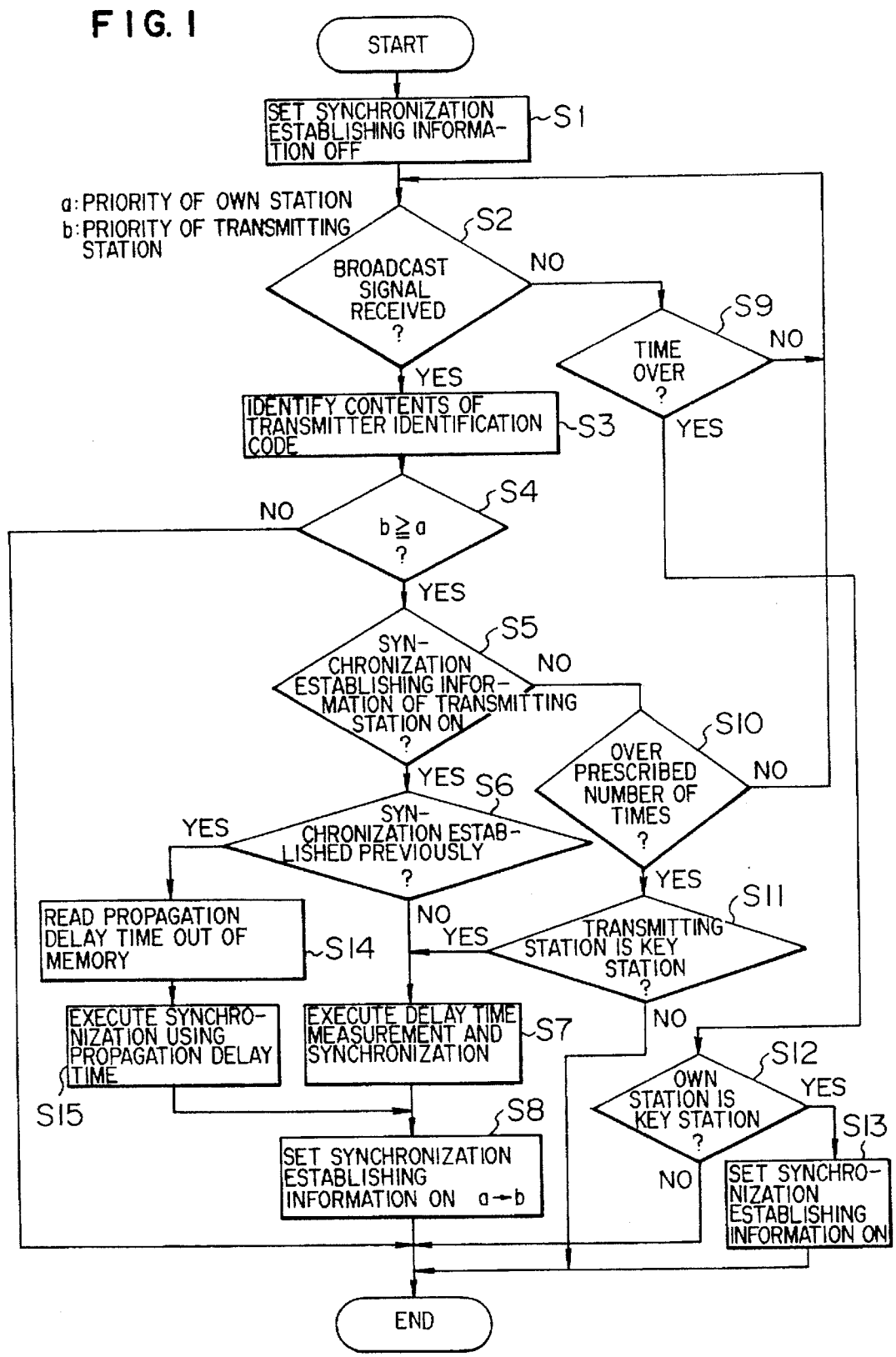
FIG. 1 is a flow chart for explaining a method of establishing synchronization according to an embodiment of the present invention.
Figure 2:
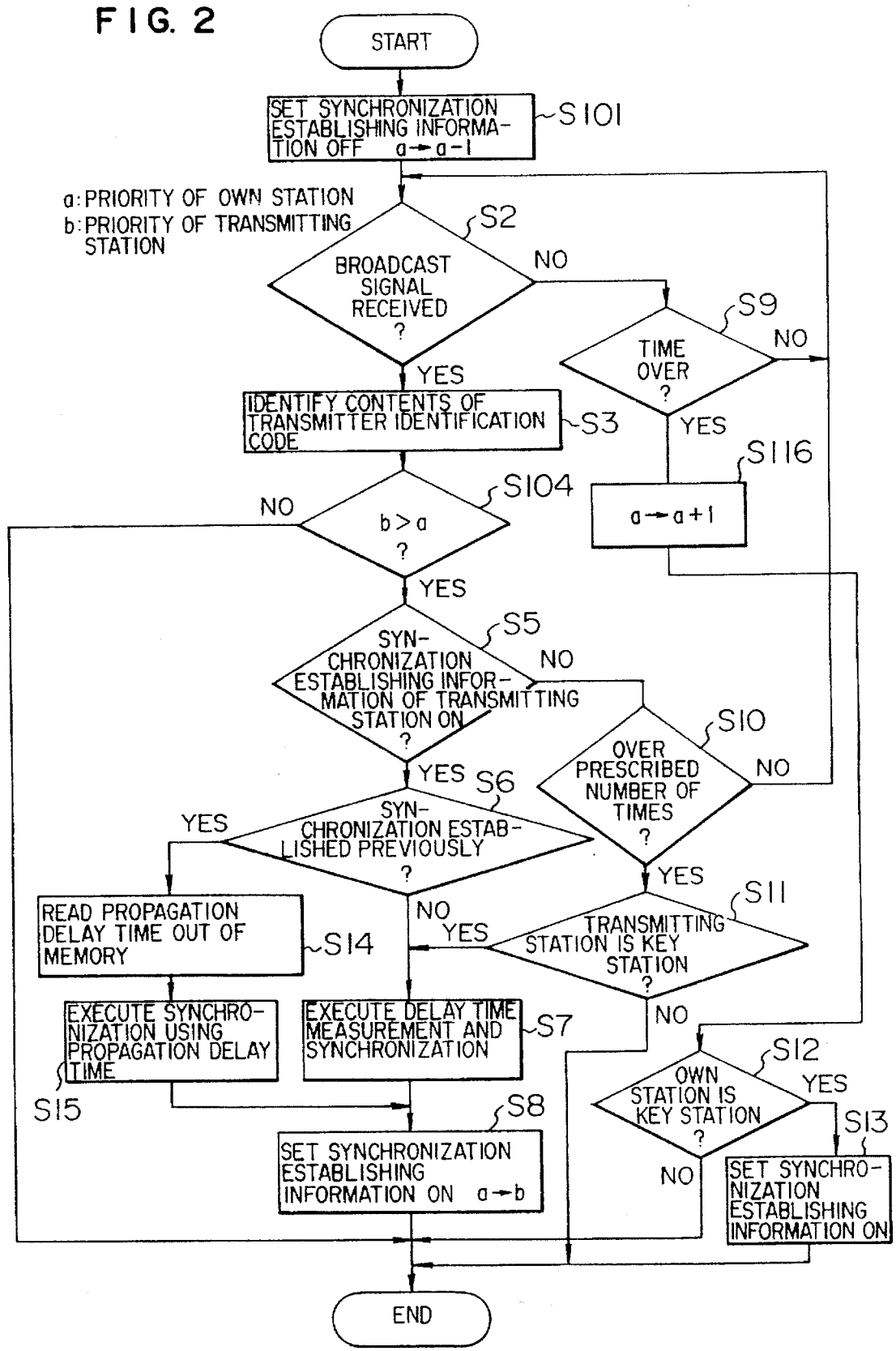
FIG. 2 is a flow chart for explaining a method of establishing synchronization according to another embodiment of the present invention.
Figure 3:
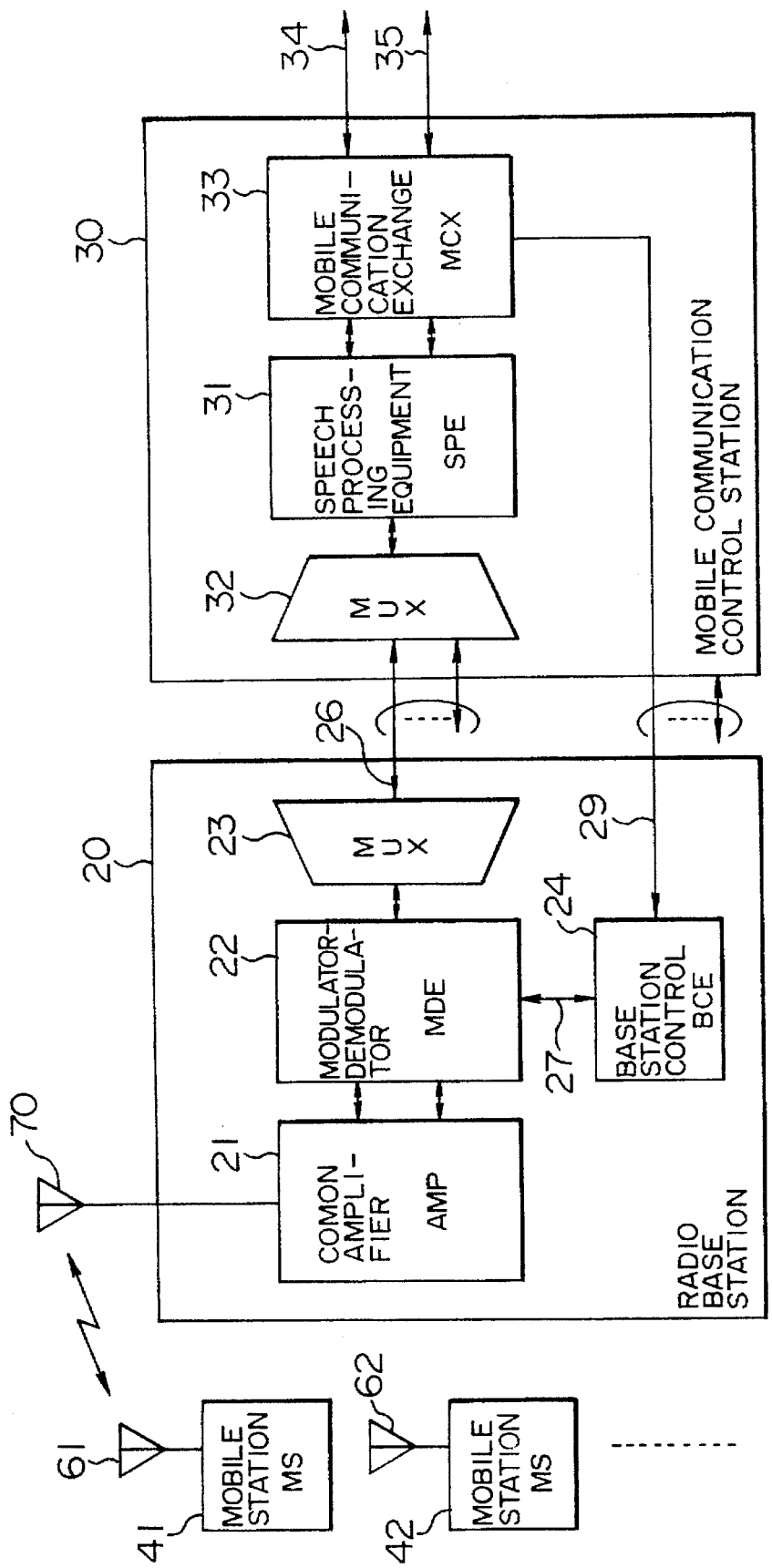
FIG. 3 is a block diagram showing structures of a radio base station and a mobile radio communication control station in the mobile radio communication system according to an embodiment of the present invention.
Figure 4:
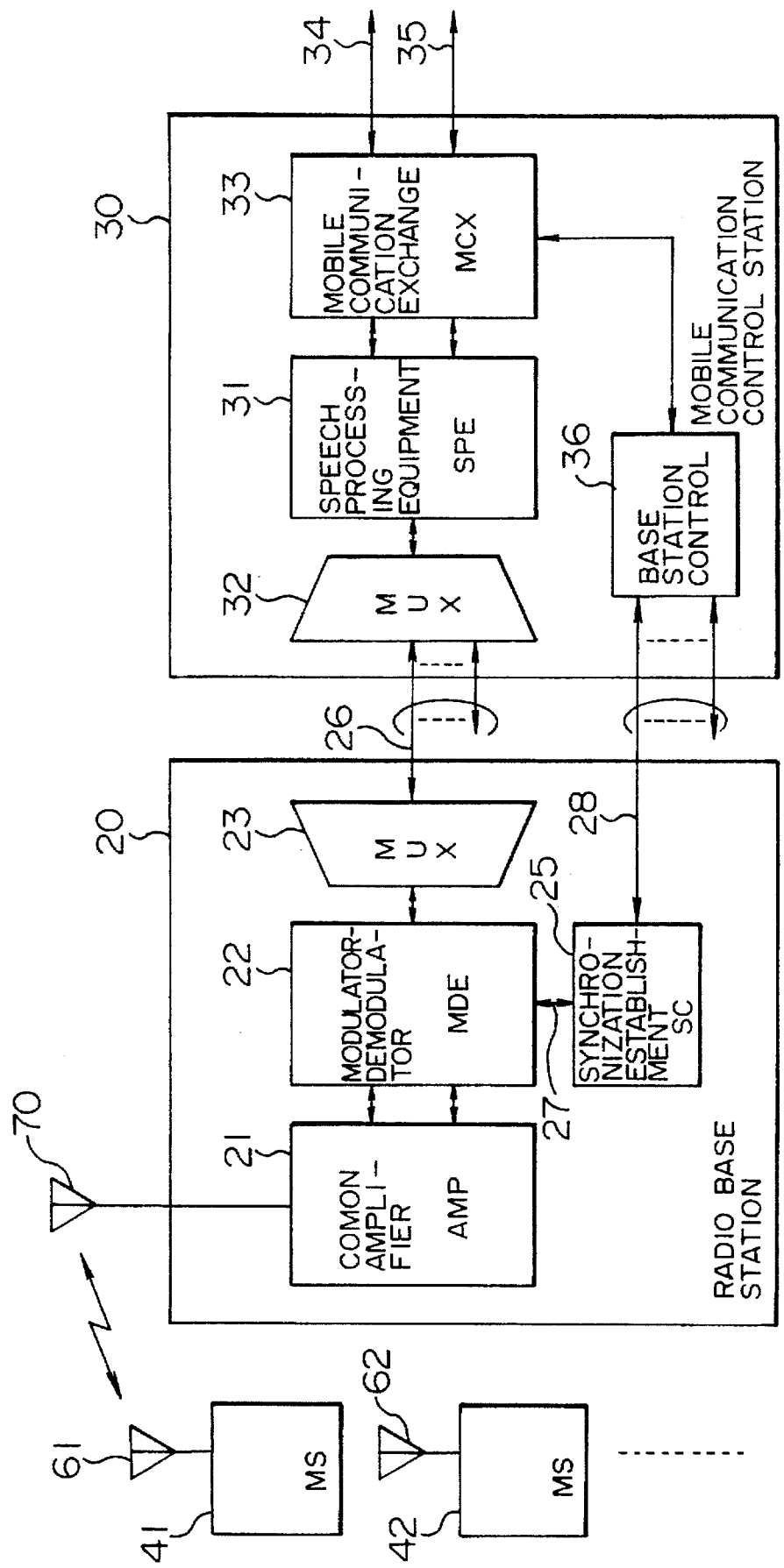
FIG. 4 is a block diagram showing structures of a radio base station and a mobile radio communication control station in the mobile radio communication system according to another embodiment of the present invention.
Figure 5:
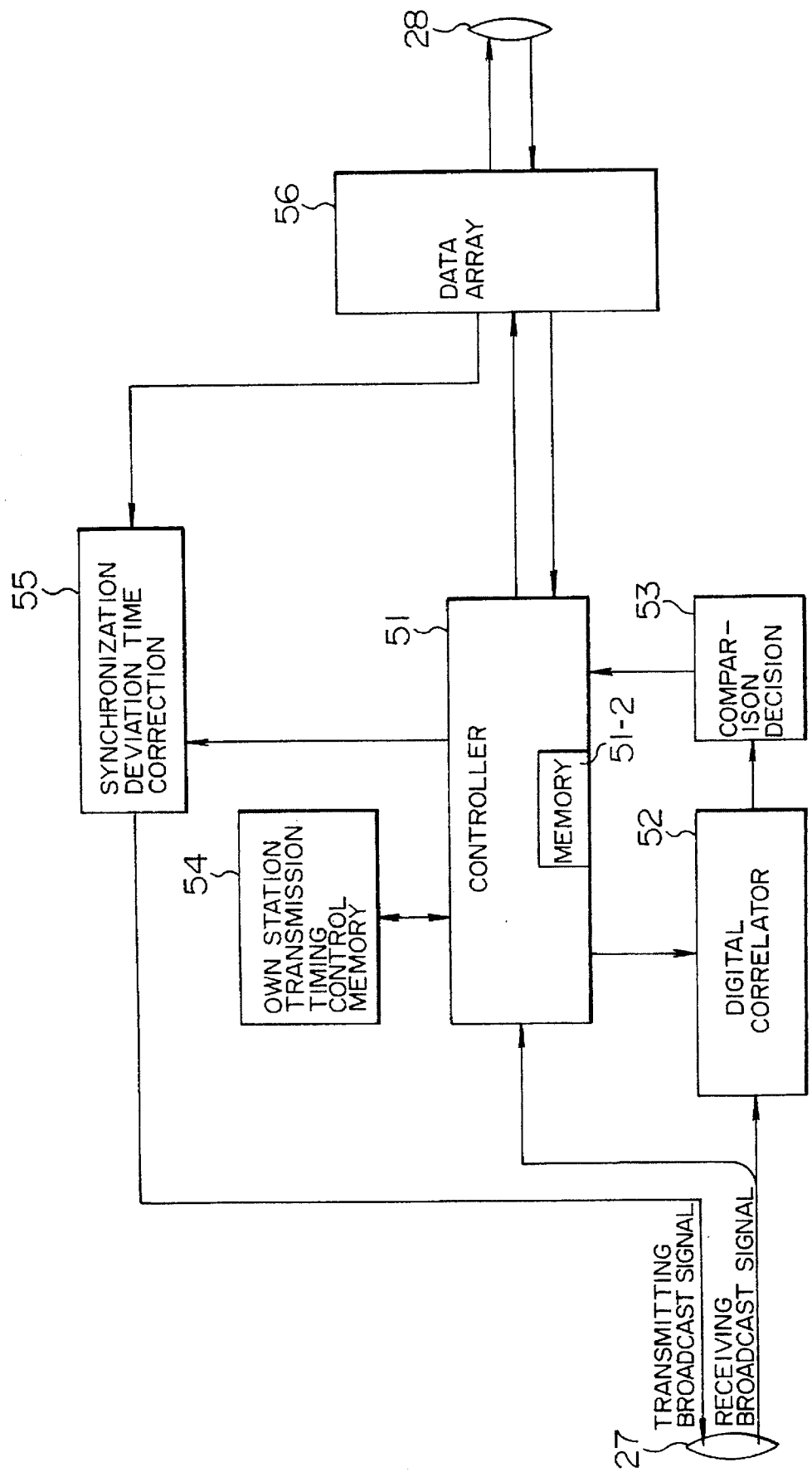
FIG. 5 is a block diagram showing an example of a structure of the synchronization establishment control unit 25 shown in FIG. 4.
Figure 6:
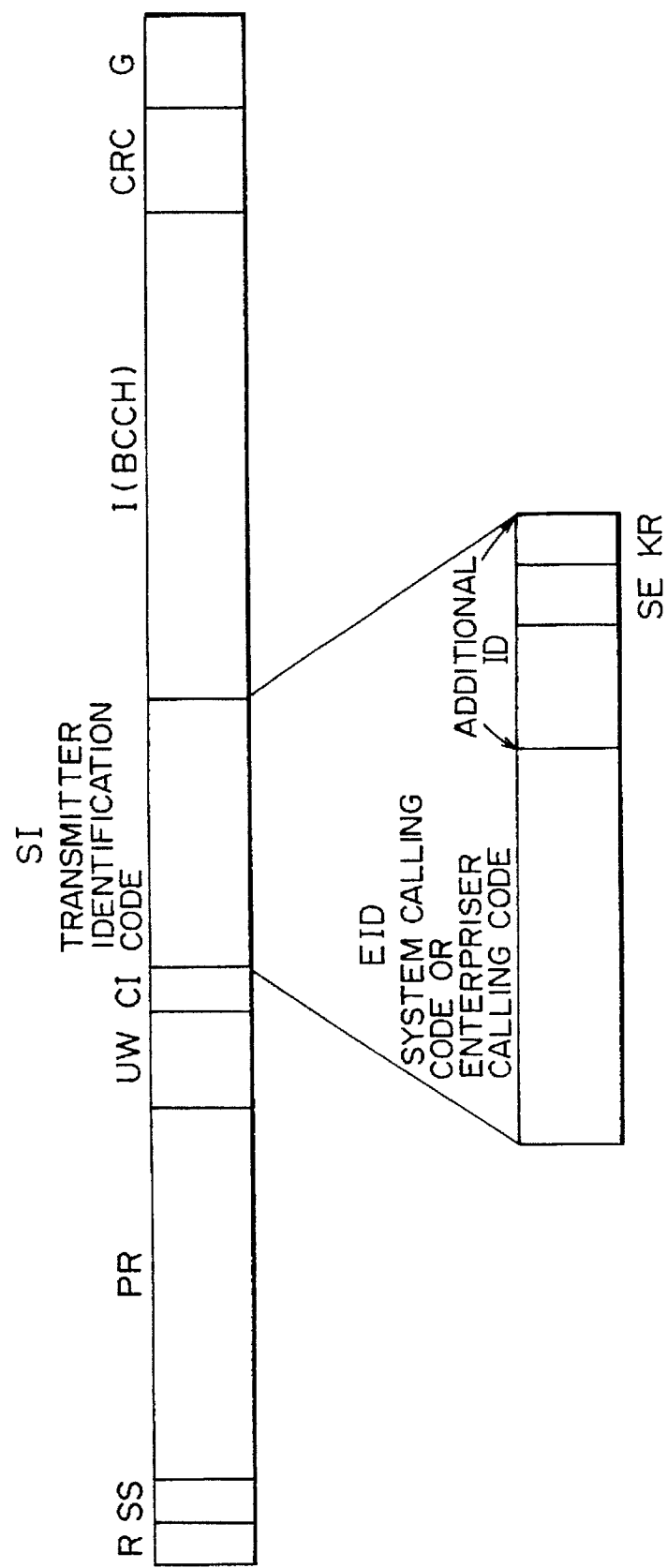
FIG. 6 is a diagram showing an example of a format of a broadcast signal used in an embodiment of the present invention.
Figure 7:
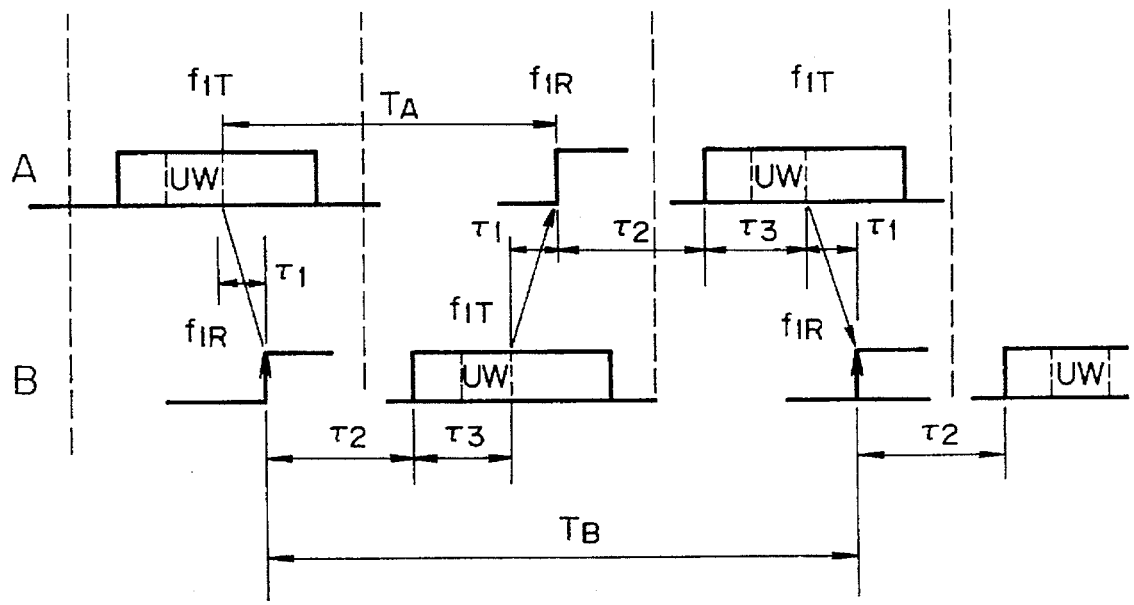
FIG. 7 is a diagram for explaining an example of a method of measuring propagation time of radiowave performed at time of synchronization establishment in an embodiment of the present invention.
Figure 8:
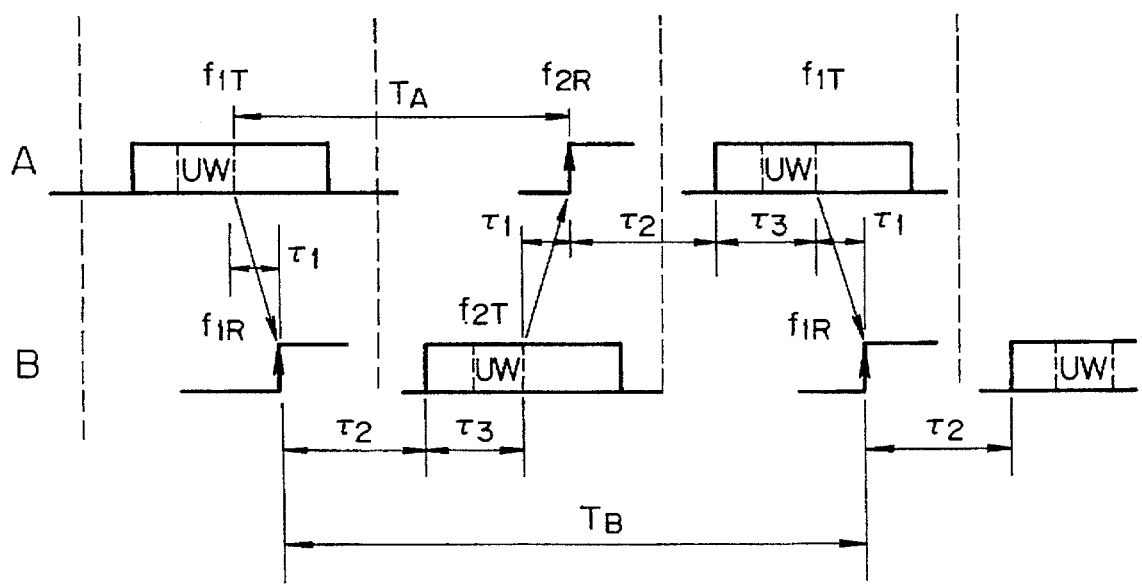
FIG. 8 is a diagram for explaining another example of a method of measuring propagation time of a radiowave performed at time of synchronization establishment in an embodiment of the present invention.
Figure 9:
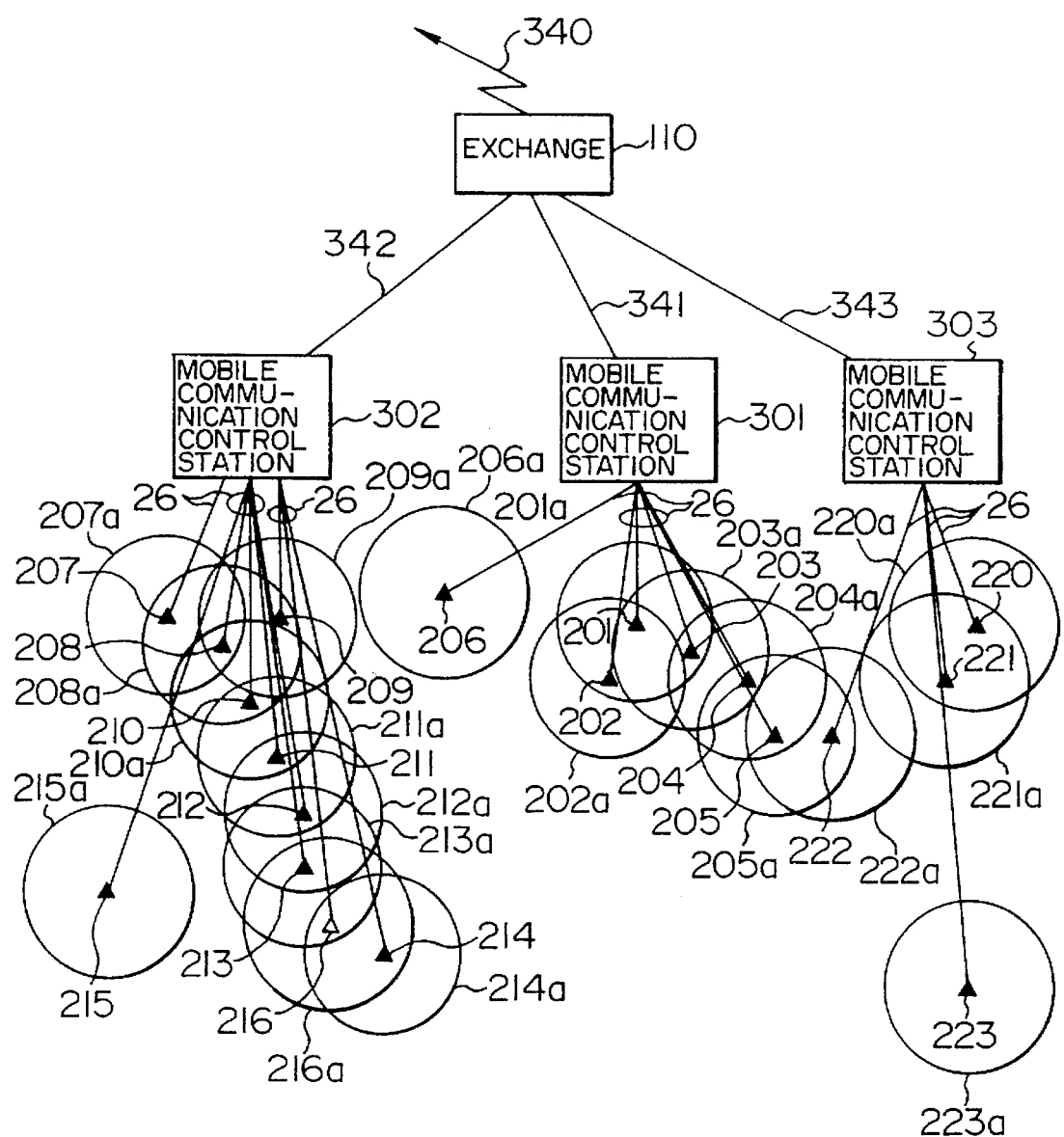
FIG. 9 is a diagram showing an example of distribution of service zones of respective base stations in a mobile radio communication system which is an embodiment of the present invention.

A method of establishing inter-base-station synchronization and a mobile radio communication system using the method according to an embodiment of the present invention will be described with reference to the drawings. Here, FIG. 1 is a flow chart showing a method in an embodiment of the present invention, FIG. 2 is a flow chart showing a method in another embodiment of the present invention, FIG. 3 is a block diagram showing structures of a radio base station and a mobile radio communication control station of the mobile radio communication system which is an embodiment of the present invention, FIG. 4 is a block diagram showing structures of a radio base station and a mobile radio communication control station of a mobile radio communication system which is another embodiment of the present invention, FIG. 5 is a block diagram showing an example of a structure of the synchronization establishment control unit 25 shown in FIG. 4, FIG. 6 is a signal format diagram showing an example of a structure of a broadcast signal used in an embodiment of the present invention, FIG. 7 is a diagram for explaining an example of a method of actually measuring propagation time of radiowave performed at time of synchronization establishment in an embodiment of the present invention, FIG. 8 is a diagram for explaining another example of a method of actually measuring propagation time of a radiowave performed at time of synchronization establishment in an embodiment of the present invention, and FIG. 9 is a diagram typically showing an example of a structure of a mobile radio communication system in an embodiment of the present invention.

Generally, in a mobile radio communication system, each of the radio base stations transmits a control signal typically a broadcast signal into the zone covered by its own radio base station at a predetermined period intermittently. This broadcast signal includes, for example, a transmitter identification signal for identifying the radio base station covering a zone in which the mobile radio station is located so that the zone can be identified and signals showing various specifications used in this zone.

In the mobile radio communication system of the present embodiment, a multizone is formed among respective radio base stations. FIG. 9 shows this status, and service zones covered by a plurality of radio base stations 201 to 205 overlap one another, thus forming a multizone. Similarly, both service zones covered by a plurality of radio base stations 207 to 213 and service zones covered by radio base stations 220 and 221 also overlap one another, thus forming a multizone, respectively.

The radio base stations 201 to 205 are connected to an exchange or a mobile radio communication control station 301 through wire transmission lines 26, and communication among mobile stations existing in service zones of different radio base stations is performed through a mobile radio communication control station 301. Similarly, radio base stations 207 to 213, 220 and 221 are also connected to mobile radio communication control stations 302 or 303 through the wire transmission lines 26, respectively, and communication among mobile stations existing in service zones of different base stations is performed through the mobile radio communication control station 302 or 303. The mobile radio communication control stations 301 to 303 are connected to a higher rank telephone exchange 110, and, for example, communication between a mobile station existing in the service zone of the radio base station 201 and a mobile station existing in the service zone of the radio base station 207 is performed through the mobile radio communication control stations 301 and 302 and the higher rank telephone exchange 110.

FIG. 3 is a block diagram showing structures of respective radio base stations 201 to 205 or the like and the higher rank mobile radio communication control station 301 or the like in the mobile radio communication system of the multizone structure illustrated in FIG. 9 typically by one radio base station 20 and one higher rank mobile radio communication control station 30. This mobile radio communication system is provided with a plurality of mobile stations (MSs) 41, 42, etc. existing in the zone covered by the radio base station 20 in addition to the radio base station (BS) 20 and the higher rank mobile radio communication control station (MCC) 30. Radio communications are set between mobile stations 41, 42, . . . and the radio base station 20 through antennas 61, 62, . . . provided to the mobile stations 41, 42, . . . and an antenna 70 provided to the radio base station 20. The mobile radio communication control station 30 is installed as a part of a private branch exchange for instance, and is connected to the radio base station 20 through wire transmission lines 26 and 29.

A signal transmitted from the antennas 61, 62, . . . of the mobile stations 41, 42 . . . is received by the antenna 70 of the radio base station 20 and inputted to a multiplexer (MUX) 23 through a common amplifier (AMP) 21 and a modulator-demodulator (MDE) 22. A plurality of signal lines 26 and control signal lines 29 as illustrated indicate that a plurality of radio base stations, in addition to the radio base station 20, are connected to the mobile radio communication control station 30. Communication between each of a plurality of base stations included in one multizone and the higher rank mobile radio communication control station 30 is performed for effective use of the transmission lines 26 by the TDMA system for instance. Namely, a plurality of time slots provided in a communication signal of a predetermined digital form are allocated to the respective base stations for the communication between each of the radio base stations and the mobile radio communication control station 30. Communication between each of the radio base stations and the mobile radio communication control station is performed by using a multiplex signal obtained by writing information to be communicated in the time slots allocated to that radio base station.

The multiplexer 23 stores once a signal received by the base station 20 from mobile stations 41, 42, . . . located in its service zone and writes the signal in the time slots allocated to the base station 20 thereby converting the signal into a multiplex signal. The converted multiplex signal is transferred to the multiplexer (MUX) 32 in the radio communication control station 30 through the transmission lines 26. The multiplex signal transferred to the multiplexer 32 is reconverted to the original signal before multiplexing, and is transferred to a mobile radio communication exchange (MCX) 33 through a speech processing equipment (SPE) 31. An output signal line 34 of the mobile radio communication exchange (MCX) 33 is connected to a public switched telephone network (PSTN).

A transmitted signal which has been transferred from the public switched telephone network to the mobile communication control station 30 to be transmitted to a mobile station is transmitted to the radio base station 20 in a reverse direction through the respective devices described above, and transmitted to a destined one of the mobile stations 41, 42, . . . from the antenna 70 after being processed for conversion or reverse conversion by the respective devices similarly to the above. The modulator-demodulator 22 and the mobile radio communication exchange 33 are controlled for various processings including synchronization by a base station control equipment (BCE) 24 through directional digital signal lines 27 and 29. Various signals indispensable for maintenance, monitoring or the like are gathered and transmitted bidirectionally also through the digital signal lines 27 and 29 and a maintenance and monitoring signal line 35 as a data base of the public switched telephone network or the like, as occasion demands. The base station control equipment (BCE) 24 includes a synchronization establishment control equipment and performs, based on the received control signal or the broadcast signal, synchronization processing for making the timing of the broadcast signal transmitted from its own station coincident with the timing of the received broadcast signal. This synchronization processing will be described in detail later with reference to FIG. 3.

FIG. 4 is a block diagram showing another structural example of the radio base station 20 and the higher rank mobile radio communication control station 30 included in the mobile radio communication system of the embodiment described above. This structural example is suitable for a small-scale radio base station, and the mobile radio communication control station 30 is installed in a subscriber's circuit of a local switchboard connected to a public switched telephone network. Besides, in FIG. 4, the same components as those in FIG. 3 are designated by the same reference numerals, and the descriptions thereof are omitted.

In a mobile radio communication system shown in FIG. 4, only components related to synchronization establishment control are separated from the base station control equipment (BCE) 24 in FIG. 3 and installed in the radio base station 20 as a synchronization establishment control equipment 25, and the other components are retained in the mobile radio communication control station 30 as a base station control equipment (BCE) 36. As a result of this modification, a control signal line 28 for connecting between the base station control equipment 36 and the synchronization establishment control equipment 25 is newly required, but simplification, miniaturization and cost reduction of a radio base station which are the subjects of a microzone system become possible, thus making its practical use easy. A plurality of signal lines 26 and control signal lines 28, as shown in FIG. 4, are used for a plurality of radio base stations, respectively.

FIG. 5 is a block diagram showing an example of a structure of the synchronization establishment control equipment 25 shown in FIG. 4. A reference numeral 51 represents a controller, 52 a digital correlator, 53 a comparison and decision circuit, 54 a transmission timing control memory, 55 a synchronization lag time correction circuit, and 56 a data array circuit. This synchronization establishment control equipment 25 executes, based on the received broadcast signal outputted to the signal line 27 from the modulator-demodulator unit 22 shown in FIG. 4 and received from another radio base station that has established synchronization, synchronization for making the transmitting timing at a radio base station coincident with the transmitting timing of the transmitting broadcast signal transmitted from its own station. The controller 51 also performs writing of synchronization establishing information into the transmitting broadcast signal of the synchronization establishing information and alteration thereof, and further stores the data related to the required propagation time of a radiowave to and from another radio base station in the internal memory 51-2 when synchronization is established.

The broadcast signal utilized for synchronization between the radio base stations is a digital control signal of a predetermined format transmitted intermittently at a predetermined constant period of approximately several seconds from each radio base station for notifying each of the mobile stations in its service zone of the zone where the mobile station is located. FIG. 6 is a signal format diagram showing an example of a structure of the broadcast signal. In FIG. 6, SS represents bits of a start symbol showing the head of the broadcast signal, R represents bits of response ramp time for allowing each mobile station time to be certain to receive SS of a start symbol, PR represents bits of a preamble used for synchronization of data bits of the broadcast signal, and UW represents unique word bits used for detecting frame synchronization.

Furthermore, CI represents bits indicating a channel used for data communication of the broadcast signal, SI represents bits indicating a transmitter identification code for identifying a transmitting base station, which is the transmitting origin of the broadcast signal, BCCH represents bits indicating various broadcast messages, CRC represents bits of a cyclic redundancy check code used for checking an error, and G represents guard bits for correcting timing shift between slots, and all of them are well known. The transmitter identification code SI further includes a system calling code or an enterprise calling code EID indicating identification of the system or enterprise relating to the broadcast signal and an additional ID. A bit SE indicating whether the synchronization has been established already or has not been established as yet is included in the additional ID.

Next, a synchronization establishment control processing utilizing the received broadcast signal, which is executed by the synchronization establishment control equipment 25 shown in FIG. 5, will be described with reference to the flow charts shown in FIG. 1 and FIG. 2. Besides, after the processing operation is described first with reference to FIG. 1, the operation in FIG. 2 which shows another embodiment will be described. In FIG. 2, however, the same reference numerals are assigned to the steps having the same processing contents as those in FIG. 1, and the detailed description thereof is omitted.

The synchronization establishment control processing in FIG. 1 is executed by means of a microcomputer incorporated in the controller 51 of the synchronization establishment control equipment 25 shown in FIG. 5. The synchronization establishment control equipment 25 starts synchronization establishment control processing shown in the flow chart of FIG. 1 when the system is started up by application of a power supply or when the comparison and decision circuit 53 detects that radiowave of the broadcast signal is interrupted and the synchronization with another radio base station has been lost during operation for some reason.

The controller 51 which has started synchronization establishment control processing inverts first, in a step S1 shown in FIG. 1, an internal flip-flop circuit holding one-bit synchronization establishing information indicating whether its own station is in a synchronization established state with another radio base station from "1" (a synchronization established state) to "0" (a synchronization non-established state), and the state is shifted to a reception wait state waiting for a broadcast signal transmitted by another radio base station in a step S2 or a step S3.

When a radio base station receives a broadcast signal from another transmitting radio base station a unique word set by the controller 51 is compared with a unique word included in a digital received signal outputted onto a bidirectional control signal line 27 from the modulator-demodulator 22 shown in FIG. 4 for decision by means of a digital correlator 52 and a comparison and decision circuit 53. Namely, the comparison and decision circuit 53 determines coincidence when the number of discord bits is at a predetermined value or smaller, and determines to be discordance when the number of discord bits is larger than a predetermined value. When the result of comparison and decision shows coincidence, notification is made to the effect that a broadcast signal has been received at the controller 51 from the comparison and decision circuit 53.

The controller 51 which has been notified to the effect that a broadcast signal has been received identifies contents of a transmitter identification code included in the received broadcast signal (a step S3). More specifically, a system calling code or an enterprise calling code EID, an addition ID or the like included in the transmitter identification code are identified. With this, it is determined, for example, that the transmitting station belongs to the same enterprise as its own station.

Next, priority information is determined in a step S4. This information relating to the priority has been written in a specific bit KR of the addition ID in the broadcast signal shown in FIG. 6. This priority is renewed to show the same priority as that of the synchronized transmitting station automatically after synchronization is executed, and can also be altered by the control of a higher rank station after the radio base station is installed as described later. Besides, as to synchronization based on the priority, it is independent of whether the radio base station is designated as a synchronizing key station.

In the step S4, assuming that the priority of the station is a and the priority of the remote station is b, it is determined whether the priority b of the transmitting station is equal to or higher than the priority a of the station (b≧a). When b≧a is determined in the step S4, the operation in a step S5 or thereafter is operated. As against the above, when b<a, i.e., when the priority of the transmitting station is lower than the priority of the station, it is determined that the station is not one to be synchronized, with the transmitting station and the synchronizing operation is not performed thereafter, and the operation in FIG. 1 is terminated.

When b≧a is determined in the step S4, the synchronization establishing information (SE) included in the transmitter identification code is determined in the step S5. This synchronization establishing information is set to ON ("1") when the radio base station which has transmitted the broadcast signal has been synchronized already with another radio base station, and it is set to OFF ("0") when it is in a synchronization non-established state with another radio base station. The controller 51, when it is determined that the synchronization establishing information is set to "1", executes synchronization in a step S6 and thereafter.

Now, measurement data of the propagation delay time of radiowave are required for executing synchronization, and exchange of a radiowave signal between the own station and the transmitting station is required several times as mentioned hereinaftr for the measurement of the propagation delay time. However, when the propagation delay time is measured in each process for synchronization, the radiowaves usable for communication are reduced, thus causing a problem that efficiency of utilization of radiowaves is lowered. So, in the present embodiment, when the propagation delay time is measured between the station and another radio base station, the data are stored in the memory 51-2 included internally in the controller 51 together with hysteresis information, and, when synchronization is made with the same radio base station next time, the data relating to the propagation delay time stored already in the memory 51-2 are read and synchronization is made utilizing these data.

Thus, in the step S6, the hysteresis information stored in the memory 51-2 are read out so as to determine from the contents of the transmitter identification code whether synchronization has ever been made in the past with the specified transmitting station. Then, when synchronization has ever been made in the past with the transmitting station, the data relating to the propagation delay time are read out of the memory 51-2 (a step S14), and synchronization is executed using these data (a step S15). By doing so, it is possible to eliminate such waste that measurement of the propagation delay time of radiowave is repeated at respective processings for synchronization establishment in the step S7 or the step S15. Besides, such processing is performed on the assumption that it is seldom that, after a radio base station is once installed, the installed location is changed although the power source is turned ON and OFF. Therefore, it is required to measure the propagation delay time again when the installed location of the transmitting station is changed.

On the other hand, when it is determined in the step S6 that synchronization has not been made in the past with the transmitting station, the propagation delay time is measured actually in that stage, and synchronization is executed based on these data (the step S7). The data of the propagation delay time obtained in this measurement are stored in the memory 51-2 for synchronization next time. Besides, the detail of the measurement of the propagation delay time performed in the present embodiment will be described later.

The synchronization in the step S7 or the step S15 is executed by calculating the lag time between the transmission timing of a broadcast signal transmitted from the own station stored in the transmission timing control memory 54 of the own station and the reception timing of a received broadcast signal, setting a correcting value for compensating for the lag time in a synchronization lag time correction circuit 55, and altering the control data in the own station transmission timing control memory 54 so as to approximately coincide with the transmission timing in the transmitting radio base station which has transmitted the received broadcast signal.

Here, in order to calculate the transmission timing in the transmitting radio base station from the reception timing of the received broadcast signal, it is required to know the propagation delay time of radiowave between the station and the transmitting radio base station which has transmitted the broadcast signal, i.e., an accurate distance between the own station and the transmitting radio base station, but for the sake of simplification, this distance is regarded as an average zone radius (e.g., 100 meters) of a personal handy phone (PHP) and correction is made by 0.33 μs equal to the propagation delay time thereof, thereby to have the transmission timing of the own station practically coincide with the transmission timing of the transmitting base station which has transmitted the received broadcast signal. When the execution of the synchronization is terminated, the controller 51 inverts the synchronization establishing information set in an internal flip-flop circuit from OFF ("0") to ON ("1").

It is also possible to adopt a method such as described hereunder as another example of correcting the propagation delay time. Namely, the propagation delay time of radiowave between each of newly installed radio base stations and each of existing radio base stations is calculated from the known distance between them when each of the new radio base stations is installed and stored in the memory 51-2 in the controller 51. The value of the propagation delay time for the transmitting radio base station which has transmitted the received broadcast signal is read out of the memory 51-2 to be used for correction when synchronization processing is executed in the step S15. In this case, it is necessary to correct the contents of the memory 51-2 when the own station or another base station are moved after installation.

When synchronization is executed in the step S7 or the step S15 as shown in FIG. 1, the priority (a) of the station is renewed to a value equal to the priority (b) of the transmitting station in a step S8, and the priority information in the broadcast signal transmitted from the station is renewed, thus completing synchronization establishment processing. By renewing the priority of each base station to the priority of the synchronized transmitting station as described above, each of the radio base stations which are synchronized successively with one another takes over the priority of the preceding base station with which it has been synchronized.

The present inventor has proposed a method of establishing inter-base-station synchronization and a mobile radio communication system using the method in a parent application, i.e., U.S. patent application Ser. No. 08/132,247 filed on Oct. 6, 1993, entitled "Method of Establishing Inter-base-station Synchronization and Mobile Radio Communication System Using the Method", of which this application is a continuation-in-part. In the method of establishing inter-base-station synchronization and the mobile radio communication system using the method, however, the priority is only given to the synchronizing key station, so that no priority is given to any radio base station other than the synchronizing key station and the priority is not succeeded to any other base station at time of synchronization. In this case, there is a problem that, when the radio base stations which have been synchronized successively one after another with different synchronizing key stations as the service zone is expanded, to form a multizone state, it is difficult for each of the radio base stations which have formed the multizone to determine the base station with which it should establish synchronization thus requiring control of a higher rank radio base station.

However, in the step S8 of the present embodiment, each base station takes over the priority of the transmitting station with which the base station has established synchronization. Therefore, synchronization is autonomously established based on the priority without control of the higher rank radio base station among the radio base stations which have been synchronized successively with different synchronizing key stations and form a multizone.

If it is determined that there is no other radio base station which forms a multizone state with the station, when its controller 51 does not receive a broadcast signal before completing the cyclic operations in a predetermined number of times in the step S2 and the step S9, the process is shifted to a step S12. Alternatively, in the step S9, it may be determined whether a predetermined time has elapsed or not. The controller 51 determines whether the station is designated as a synchronizing key station in the step S12, and when it is designated as the synchronizing key station, the processing shifts to the step S13 to alter the synchronization establishing information to ON ("1"), thus completing the synchronization establishment control processing. On the other hand, when it is determined that the station has not been designated as a synchronizing key station in the step S12, the controller 51 terminates the synchronization establishment control processing while maintaining the synchronization establishing information at an OFF ("0") state.

There are such considerations in a background of the operation described above, as follows. Namely, the process for synchronization is not carried out in the steps S2, S9 and S12, because the station does not form a multizone with another radio base station so that no interference is generated with the other base station and thus normal operation becomes possible even if synchronization is not made. In this case, the synchronization establishing information is set to "ON" when the station is designated as the synchronizing key station in the step S12, in order to cause, when a new radio base station having a lower priority than that of the station is installed at a location adjacent thereto, the new radio base station to be synchronized with the station which is the synchronizing key station. In this case, the newly installed radio base station takes over the priority of the station which is the synchronizing key station. Besides, when new radio base stations are installed, it is determined by a higher rank station whether each of the new radio base stations is designated as a synchronizing key station or not. The designation of the synchronizing key station and the cancellation of designation can also be performed by the control of the higher rank station after the radio base station is installed.

The priority of each of the radio base stations is given by the higher rank station when the radio base station is installed or at an appropriate time after installation. For example, any one of 11 ranks of "0" to "10" may be given as the priority. For example, when the newly installed base station is not a synchronizing key station, its priority is set to "0". When designated as a synchronizing key station, a value selected from the priority values of "1" to "5" is given to an isolated station which does not form a multizone with other base stations in such a manner that "5" is given when the isolation station is expected to become a relatively important base station, and "1" is given when it is judged that the degree of importance is low.

On the other hand, when the newly installed base station is not an isolated station, the priority value selected from values of "6" to "10" is given depending on the degree of importance.

It is a matter of course that the foregoing shows an example and the present invention is not limited thereto, and various modifications are applicable. Further, the higher rank station is able to alter the priority once given to each base station depending on its relationship with other base stations.

In a system in which synchronization is carried out by using priority information as described above, when a radio base station B receives a broadcast signal from another radio base station A (which is assumed to have been designated as a synchronizing key station) which forms a multizone with the station B and has a priority equal to or higher than that of the station B, the radio base station B executes synchronization with the radio base station A as shown in FIG. 1 and the priority of the station B is renewed so that it becomes equal to the priority of the radio base station A. Thereafter, when another radio base station C, the priority of which is assumed equal to or lower than that of any of the radio base stations B and A, receives a broadcast signal from the radio base station B thereafter, the radio base station C executes synchronization with the radio base station B and also the priority of the station C is renewed so that it becomes equal to the priority of the radio base station B.

In this manner, when radio base stations B and C, etc. forming a multizone with the radio base station A having high priority are installed, these radio base stations execute synchronization successively one another in a falling-dominos fashion starting from synchronization with the radio base station A, thus performing what is called step-wise synchronization. Then, the respective radio base stations B, C, have the priority equal to that of the radio base station A.

Now, in the step S5 shown in FIG. 1, for example, it is assumed the power source is disconnected temporarily in the remote station for some reason and the synchronization establishing information of the remote station is in an off-state immediately after the power source is built up again. In this case, it is possible that the radio base station which intends to execute synchronization with the remote station is also in a multizone state with another radio base station different from the remote station. Thus, the radio base station judges whether the another station is in a multizone state with the own station and has a priority equal to or higher than that of the own station by repeating the steps of S10 and S2 to S5 several times. In particular, at a location where a plurality of radio base stations are densely installed such as railway stations and airports, such situation will occur.

Then, when it is determined after repeating the above-described steps by a predetermined number of times that there is no other base station with which the synchronization can be established, it is determined in a step S11 whether the remote station of which the synchronization establishing information is in the off-state is a synchronizing key station or not. In the case it is the synchronizing key station, the propagation delay time is measured in the step S7 and synchronization is executed. When the remote station is not a synchronizing key station, no synchronization is executed and the off-state of the synchronization establishing information is also maintained. Besides, when the power source is built up, any radio base station should execute synchronization with any other radio base station at that stage, and hence it is seldom practically that the synchronization establishing information is in the off-state in the step S5.

Next, the operation of the flow chart shown in FIG. 2 will be described. In FIG. 2, in a step S101 (corresponding to the step S1 shown in FIG. 1), the internal flip-flop circuit holding one-bit synchronization establishing information indicating whether a radio base station is in a synchronization establishing state is inverted from the state "1" (synchronization established state) to the state "0" (synchronization non-established state), and the priority value of the own station is reduced by one to (a-1) which is the new priority of the station. This point is different from the case shown in FIG. 1.

With this, in a step S104 (corresponding to the step S4 shown in FIG. 1), it is determined whether the priority b of the remote station is higher than the priority a of the station (b>a). Thus, the work of determination is simplified as compared with the step S4 shown in FIG. 1. Further, in the steps S2 and S9 in FIG. 2, when the controller 51 receives no broadcast signal before repeating the steps at a predetermined number of times, and it is determined that no other radio base station which forms a multizone with the station exists, the value of the priority a of the station is increased by "1" to a+1 in the step S116, and the process is shifted to the step S12 thereafter similarly to the case shown in FIG. 1. This is performed for the purpose of returning the priority reduced by 1 in the step S101 to the original value. Besides, the steps of FIG. 2 having the same reference numerals as those of FIG. 1 performs same processings as those in FIG. 1 as described previously, and hence the detailed description thereof is omitted.

In the above-described embodiment, correction of synchronization deviation is made based on propagation delay time of radiowave at an average distance among a plurality of base stations forming a multizone or propagation delay time of radiowave calculated from the practical distance from another radio base station and stored in a memory. In order to realize accurate synchronization between the radio base stations, however, it is necessary to obtain the propagation delay time of radiowave between the radio base stations accurately by actual measurement. Thus, in another embodiment of the present invention, propagation delay time of radiowave between the base stations is obtained accurately by actual measurement in place of the propagation delay time of radiowave calculated from an average distance among the base stations or from an actual distance. First, in advance of the description of the present embodiment, the actual circumstances of the propagation delay time of a radiowave between the radio base stations and problems existing in accurate actual measurement thereof will be described.

In a microcell mobile radio communication system, small-cell coverage zones, each having a radius of several hundred meters to several ten meters are formed. Therefore, the propagation delay time required for the radiowave emitted from a certain radio base station to reach an adjacent base station is normally several hundred ns to several µs. The propagation delay time of this order is negligibly small as compared with a transmission speed of control data of a typical mobile radio communication system. For example, in a personal handy phone (PHP) expected to be put to practical use, the transmission speed of the control signal is 384 Kbps (period: approximately 2.6 µs). Since 100 meters to 200 meters are assumed as the cell radius in this case, the propagation delay time between adjacent base stations is approximately 0.33 µs to 0.66 µs.

There is also such a problem in an autonomous system of mutual synchronization between base stations described in Akaiwa et al., the Institute of Electronic Information Communication Engineers in Japan, National Spring meeting 1991, B-344 and an Autumun meeting 1991 B251. Namely, in a recent mobile radio communication system, a system for increasing or decreasing transmitting power at a base station in accordance with increase or decrease of the traffic has been proposed as described in the Institute of Electronic Information Communication Engineers, Spring Meeting 1992, B-319 or the like. In this case, however, a frame phase is deviated with increase or decrease of the transmitting power at each radio base station, thereby producing an error in a measured value of the signal timing, and making synchronization inaccurate correspondingly. Furthermore, even when the average transmitting power is neither increased nor decreased, there is a problem that the frame phase is deviated with sudden fluctuation of the transmitting power caused by transmission of radiowave in a burst form at respective slots in a TDMA system, thus causing inaccurate synchronization.

Generally, in a mobile radio communication system, the control of transmitting power at a base station has a tendency to become still more complicated in consideration of effective utilization of frequencies, accommodation of handover function to a high-speed moving carrier and the cell radius of a microcell (in other words, an average receiving level of radiowave) changes dynamically depending on conditions such as traffic and site factors and selection of the frequency to be utilized and is not constant. In particular, in a future mobile radio communication system by the TDMA system, a system in which large-cell coverage zones (macrocells) each having a radius of 1 Km to 15 Km corresponding to an existing car telephone system and microcells are mixed (overlaid) has been proposed. With regard to synchronization among the radio base stations in such an overlay system, the synchronization error produced by the propagation delay time or the like, which is not compensated completely, is larger than the synchronization error produced by fluctuation of the frame length between the radio base stations, which is derived from frequency deviation of a crystal oscillator in each radio base station. Besides, it is difficult in principle to compute the distance between the radio base stations from a receiving level, and it is still more difficult to compute it based on a radiowave (an interference wave) delayed by multipath reflection.

Next, an example of a method of measuring accurate propagation delay time of radiowave between radio base stations which is employed in the present embodiment will be described with reference to FIG. 7.

First, for adjacent base stations A and B which have formed a multizone mutually, the propagation delay time is measured using a common control channel $f_1$. Suffixes T and R added to $f_1$ in the figure indicate uses for transmission and reception, respectively. In the adjacent radio base stations A and B, previous arrangements are made as to the frequency $f_1$ of the control channel used for the measurement of the propagation delay time between the radio base stations using an appropriate control channel such as a predetermined slot of the broadcast signal and the communication steps of procedure prior to commencement of the measurement of the propagation delay time. In the example shown in FIG. 7, it is assumed that the radio base station A is in the synchronization established state, and the base station B executes synchronization with the base station A.

When it is assumed that the propagation delay time of radiowave between the base stations A and B is $\tau_1$, a unique word (UW) included in the broadcast signal transmitted from the base station A is detected by the base station B with a delay of $\tau_1$. The base station B starts transmission of a broadcast signal including a unique word at a lapse of a predetermined period of time $\tau_2$ after detecting the unique word transmitted from the base station A, and this broadcast signal is detected by the base station A with a delay of the propagation delay time $\tau_1$. The base station A which detects the unique word transmits a broadcast signal including the unique word to the base station B again at a lapse of predetermined time after detection of the unique word. Here, it is assumed that the base stations A and B are operated by the same hardware and software. In this case, the time $\tau_2$ from detection of the unique word included in the received broadcast signal to start of transmission of a next broadcast signal becomes equal both in the radio base stations A and B. Similarly, the time $\tau_3$ from start of transmission of the broadcast signal to end of transmission of the unique word also becomes equal in the radio base stations A and B.

Accordingly, the time $T_B$ from the radio base station B detecting the unique word transmitted from the radio base station A to the base station B again detecting the unique word is obtained by referring to FIG. 7, as follows.

$$T_B = \tau_2 + \tau_3 + \tau_1 + \tau_2 + \tau_3 + \tau_1 \quad (1)$$
$$= 2\tau_1 + 2(\tau_2 + \tau_3)$$

From the expression (1), the propagation delay time $\tau_1$ is obtained as follows.

$$\tau = T_B/2 - (\tau_2 + \tau_3) \quad (2)$$

As described above, $\tau_2 + \tau_3$ may be regarded as a constant value when the jitter or the like is neglected.

It may also be arranged so that the propagation delay time is measured at the radio base station A in place of the radio base station B, and the results of measurement are informed to the radio base station B utilizing an appropriate control channel. In this case, when it is assumed that the time interval from a time when the radio base station A terminates transmission of the unique word to a time when the radio base station A detects he unique word transmitted from the radio base station B is $T_A$, the following expression is obtained.

$$\tau_1 = T_A/2 - (\tau_2 + \tau_3)/2 \quad (3)$$

Furthermore, the system may be structed so that average values of $T_B$ and $T_A$ covering a plurality of frames are measured by repeating the communication sequence of the broadcast signal including the unique word in a plurality of times consecutively, and the average value of propagation delay time $\tau_1$ is calculated from the expressions (2) and (3) based on the average values of $T_A$ and $T_B$. With this structure, more accurate propagation delay time in which the influence of fluctuation of $\tau_2 + \tau_3$ by jitter or the like is reduced can be obtained.

Further, when $\tau_2$ differs depending on the radio base station due to the differences of software and/or hardware, between the radio base stations, it may be structured so that a value of $\tau_2$ in each base station is informed to an adjacent radio base station while including the value in a control signal or the like.

FIG. 8 shows another example of a method of measuring a radiowave propagation delay time.

In FIG. 8, two control channels of appropriate frequencies $f_1$ and $f_2$ are allocated in advance to the communication sequence for measuring the propagation delay time, and these control channels are used alternately. In this method, although it takes time for switching the control channels, it is possible to measure the propagation delay time in a similar manner to the case shown in FIG. 7 by setting the value of $\tau_2$ including the time required for switching.

A mobile radio communication system and a method of establishing inter-base-station synchronization of the above-described embodiment will be supplemented with reference to FIG. 2 again.

In FIG. 9, a lower rank mobile radio communication station 301 such as a PBX and a terminal exchange and mobile radio communication control stations 302 and 303 are connected to a higher rank exchange 110 through communication lines 341, 342 and 343. The higher rank exchange 110 is connected further to a higher rank exchange network through a signal line 340. The radio base stations 201 to 205 such as telephone sets belonging to respective houses and public telephone sets accommodated in the lower rank mobile radio communication station 301 through signal lines 26 (including signal lines 29 in FIG. 3 and signal lines 28 in FIG. 4) are arranged while forming multizones mutually including the other radio base stations in respective service zones 201a to 205a thereof. However, a radio base station 206 accommodated in the lower rank mobile radio communication station 301 includes no other radio base station in a service zone 206a thereof.

On the other hand, radio base stations 207 to 213 accommodated in the mobile radio communication control station 302 through the signal lines 26 are arranged while forming multizones mutually including other radio base stations in respective service zones 207a to 213a thereof. However, radio base stations 214 and 215 connected to the mobile radio communication control station 302 include no other radio base station in respective service zones 214a and 215a thereof, but it is assumed that radio base station 216 is installed newly thereafter. Here, the service zone 216a is a service zone of the radio base station 216 installed later.

The radio base stations 220 and 221 accommodated in the mobile radio communication control station 303 through the signal lines 26 are arranged while forming multizones mutually including other radio base stations in respective service zones 220a and 221a thereof. Further, it is assumed in this case that a radio base station 222 is also a radio base station newly installed later, and is arranged so as to include a radio base station 205 accommodated in another mobile radio communication control station 301 in a service zone 222a of its own station as shown in FIG. 9. Besides, no other radio base station is included in a service zone 223a of a radio base station 223.

In the mobile radio communication system shown in FIG. 9, the radio base stations 201 to 205 in a multizone state with contiguous zones are synchronized with appropriate remote stations included therein based on priority information. Besides, a synchronizing key station is designated through the mobile radio communication control station 301. When no synchronizing key station is designated, however, synchronization based on priority is made without determining that a synchronizing key station is designated in the step S12 shown in FIG. 1 or FIG. 2 in synchronization of these radio base stations. Further, the radio base stations 220 and 221 in a multizone state are synchronized with each other, and the radio base stations 207 to 213 in a multizone state with one another are also synchronized. Then, the radio base stations 206, 214, 215 and 223 which are not in a multizone state with any one of the contiguous radio base stations operate in an asynchronous state with other radio base stations. In this case, the priority of the radio base stations 206, 214, 215 and 223 which are isolated stations takes over the priority of a synchronizing key station at an appropriate level set through mobile radio communication control stations 301 to 303, but it is also possible to set it over again to lower priority including 0 (no priority) as occasion demands. By doing so, synchronization is easier when a multizone state is produced.

It is assumed that a radio base station 216 with a child set (a PHP) is newly installed in this state as the radio base station accommodated in the mobile radio communication control station 302. This newly installed radio base station 216 forms multizones with the contiguous radio base stations 213 and 214 in which synchronization has been already established. In this case, it is assumed that low priority has been given to the radio base station 214 since it is an isolated station, and that the radio base station 213 has taken over the priority at an appropriate level which has been set already through the mobile radio communication control station 302 when synchronized. Then, the radio base station 216 determines the priority and executes synchronizing operation with the radio base station 213 when it receives broadcast signals from both the radio base stations 213 and 214. In this case, the priority of its own station is renewed to the priority of the remote station 213 which has higher priority.

It is assumed that the radio base station 214 is brought to a synchronization non-established state because of disconnection of the power source due to construction and other reasons. In that case, the radio base station 214, when it receives a broadcast signal from the radio base station 216 which has shifted newly to a synchronized state, shifts to a synchronized state with the radio base station 216, and also renews the priority so as to become equal to the priority of the radio base station 216. With a fact that the radio base station 216 is added newly as described above, the peripheral radio base stations which form a multizone with this station 216 are shifted to a subordinately synchronized state in a chain-reacting manner or a falling-dominos fashion, and the priority is also renewed respectively.

Further, it is assumed that a new radio base station 222 connected to the mobile radio communication control station 303 is installed with such arrangement as shown in FIG. 9. A radio base station 205 having another priority is included in the zone 222a of the radio base station 222 as a synchronizing key station at an appropriate level which is set through the mobile radio communication control station 301, and both form a multizone state. In this case, it is assumed that this radio base station 222 has taken over the priority as the synchronizing key station at an appropriate level which is set through the mobile radio communication control station 303.

When the newly installed radio base station 222 forms a multizone state with the radio base station 205 connected to a different mobile radio communication control station as described above, the controller 51 of the radio base station 222 also determines whether synchronization is to be made by determining the priority of the remote station in the step S4 shown in FIG. 1 or FIG. 2. The control by the higher rank mobile radio communication control station 301 or the like is not required in the synchronizing operation, thus executing autonomous synchronization among radio base stations only. When the priority of the radio base station 205 is equal to or higher than the priority of its own station, the radio base station 222 performs synchronization with the radio base station 205 notwithstanding that it is connected to the mobile radio communication control station 301 different from the own station.

When the radio base station is equivalent to a radio base station which is not a synchronizing key station even if it is a synchronizing key station and is brought to a synchronization non-established state due to reconnection of a power supply, lowering of an electric field strength and other causes in case synchronization based on priority is made, the radio base station executes synchronization establishing operation directly with another synchronizing key station or indirectly through a radio base station which is not a synchronizing key station synchronized herewith when a broadcast signal including priority information and synchronization establishing information is received directly from the other synchronizing key station or a radio base station which is not a synchronizing key station synchronized with this synchronizing key station.

For example, when a case that synchronization is made by processing in such two stages whether the radio base station is designated as a synchronizing key station or not is considered without performing synchronization based on priority, the trouble is caused that no synchronization is made indefinitely among a plurality of radio base stations which are not synchronizing key stations brought into a multizone state apart from the synchronizing key station. Like the present embodiment, however, it is possible to avoid the trouble in synchronization in the processing only in two steps whether the radio base station is designated as a synchronizing key station or not by adopting a system in which priority to respective base stations is given in advance, this priority is determined when synchronization is made, and, when the radio base station is synchronized with the remote station based on the results of this determination, the priority of the relevant remote station is taken over as it is.

A case where the service zone of a microcell is expanded gradually and a service zone which has been independent is merged into the service zone which has been expanded may be assumed. In such a case, it is possible to have radio base stations in an expanded service zone synchronize with one another after the lapse of a fixed time by performing control based on priority information from a higher rank mobile radio communication control station, a further higher rank exchange or the like by performing processing such as described above.

Due to a fact that respective contiguous radio base stations are synchronized with one another, the control for zone switching becomes easy by synchronization among radio base stations in handoff, etc. Further, even when the radio base stations of a microcell system are additionally installed one after another due to selling-off of terminals, addition of circuits is not required especially, but synchronization among the radio base stations is established autonomously and automatically. Accordingly, synchronization is surely established among radio base stations or the like located among a plurality of enterprises or around a high traffic zone, and the control of radio circuits in use of the same terminal covering houses, offices and outdoor (public) networks is made easier and more efficient.

Furthermore, it is possible to realize synchronization among respective radio base stations with very high accuracy of the order of fluctuation errors caused by the jitter of the transmitter-receiver in respective radio base stations by actually measuring required propagation time of radiowave between the radio base stations and establishing synchronization based on these actually measured values.

Besides, the present invention is not limited to the foregoing, but various modifications can be made within the scope of the gist thereof. For example, a case in which several of respective radio base stations shown with marks ▲ are designated as synchronizing key stations has been described in FIG. 9 of the above-mentioned embodiment, but it is also possible to provide mobile radio base stations 301 to 303 with a function as a radio base station and designate any of them as one of the synchronizing key stations. For example, when the power source is disconnected due to construction or the like in one of a plurality of radio base stations in a mutually synchronized state and the power source is connected again thereafter, it is also possible to incorporate in advance such algorithm as to make the priority of that radio base station the lowest. By doing so, a radio base station in which the power source is recovered shifts to a synchronized state similar to before quickly between the radio base station and surrounding radio base stations.

Further, various structures described below are applicable for shortening the period of time required for synchronization establishment between radio base stations. Those are: a structure that, while a plurality of carriers are allocated to a normal broadcast signal, the period of time required for the radio base station on the receiving side to detect the received broadcast signal is shortened by allocating a specific carrier among those carriers to the broadcast signal utilized for synchronization establishment; a structure in which only a specific radio base station such as a synchronizing key station transmits the broadcast signal for synchronization establishment; and a structure in which a repetitive period of a broadcast signal transmitted for every several frames is set to the minimum repetitive period (such as a period corresponding to a super frame in a PHP).

Furthermore, a case of the TDMA system has been explained, but the present invention is applicable not only to the TDMA system, but also to the CDMA system in point of synchronization between base stations in a small zone structure by a digital system.

I claim:

1. A method of establishing synchronization among a plurality of radio base stations forming a mobile radio communication system comprising the steps of:

transmitting from each of the radio base stations a radio control signal including priority information indicating a synchronization priority of the radio base station, and synchronization establishing information indicating whether synchronization has been established between the radio base station and any other one of the radio base stations; and establishing synchronization in any one of the radio base stations, which is acting as a receiving base station, when the receiving base station receives the radio control signal transmitted from another transmitting radio base station, with the transmitting base station, provided that the receiving base station has not previously established synchronization, and providing that the priority information included in the received radio control signal indicates that the receiving base station is allowed to establish synchronization with the transmitting base station, and providing that the synchronization establishing information included in the received radio control signal indicates that the transmitting base station has established synchronization; and changing, when the receiving base station has established synchronization with the transmitting base station, the priority of the receiving base station to the priority of the transmitting base station.

2. A method of establishing inter-base-station synchronization according to claim 1, wherein said receiving base station is allowed to establish synchronization with said transmitting station when the priority of said transmitting base station is equal to or higher than the priority of the receiving base station.

3. A method of establishing inter-base-station synchronization according to claim 1, wherein said receiving base station is allowed to establish synchronization with the transmitting base station, when the priority of the transmitting base station is higher than a new priority of the receiving base station, which is obtained by reducing its original priority by "1".

4. A method of establishing inter-base-station synchronization according to claim 1, further comprising the steps of designating at least one of said respective radio base stations as a synchronizing key station and changing the synchronization establishing information included in the radio control signal transmitted from said at least one radio base station to a state indicating that synchronization has been established, when said at least one radio base station has not yet established synchronization and receives no control signal for a predetermined period of time.

5. A method of establishing inter-base-station synchronization according to claim 4, wherein said synchronizing key station is designated when said at least one radio base station is installed.

6. A method of establishing inter-base-station synchronization according to claim 4, wherein said predetermined period of time is a time required for the receiving base station to repeat a step of determining that it has received no control signal by a predetermined number of times.

7. A method of establishing inter-base-station synchronization according to claim 1, further comprising the steps of designating at least one of said radio base stations as a synchronizing key station, reducing the priority of said at least one radio base station by "1" thereby generating a new priority thereof, returning the new priority to the original priority when said at least one radio base station receives no radio control signal for a predetermined period of time after generation of the new priority of said at least one radio base station, and changing said synchronization establishing information included in the radio control signal transmitted by said at least one radio base station to a state indicating that synchronization has been established.

8. A method of establishing inter-base-station synchronization according to claim 1, wherein said receiving radio base station corrects, when establishing synchronization with said transmitting base station, a starting time in transmission of the radio control signal from the receiving base station based on a propagation delay time of radiowave between the receiving radio base station and the transmitting base station.

9. A method of establishing inter-base-station synchronization according to claim 8, wherein said propagation delay time is determined from a time predetermined from a size of a zone covered by said receiving radio base station.

10. A method of establishing inter-base-station synchronization according to claim 8, wherein said propagation delay time is determined from a predetermined delay time stored in said receiving radio base station.

11. A method of establishing inter-base-station synchronization according to claim 8, wherein said propagation delay time is determined based on a time interval required for a radio wave to make one round transmission between the receiving base station and the transmitting base station when repeatedly transmitting and receiving the radio wave at a predetermined time interval between them.

12. A method of establishing inter-base-station synchronization according to claim 1, wherein said receiving radio base station changes said synchronization establishing information of the control signal transmitted from the receiving base station to a synchronization non-established state, before establishing synchronization in said receiving base station which has not previously established synchronization.

13. A mobile radio communication system comprising a plurality of radio base stations, each performing radio communication with a mobile station in a service zone of the base station, each of said radio base stations comprising:

means for including, in a radio control signal transmitted from the radio base station, priority information indicating a priority of the base station relating to synchronization establishment, and synchronization establishing information indicating whether synchronization has been established between the radio base station and any other one of the radio base stations;

priority determining means operative, when the base station receives the radio control signal from another transmitting radio base station, and when the base station has not established synchronization, for determining whether said transmitting base station is a radio base station with which the base station is allowed to establish synchronization based on said priority information included in said received radio control signal;

synchronization establishment determining means for determining whether said transmitting base station has already established synchronization based on said synchronization establishing information included in said received radio control signal;

synchronization establishing means operative, when it is determined that the base station is allowed to establish synchronization with the transmitting base station and that said transmitting base station has already established synchronization, for establishing synchronization between the base station and said transmitting base station; and priority changing means operative, when synchronization is established by said synchronization establishing means, for changing the priority of the base station to a new priority corresponding to the priority of the transmitting base station.

14. A mobile radio communication system according to claim 13, wherein said priority determining means determines, when the priority of said transmitting base station is equal to or higher than the priority of the base station, that the base station is allowed to establish synchronization with said transmitting base station.

15. A mobile radio communication system according to claim 13, wherein said priority determining means determines that the base station is allowed to establish synchronization with the transmitting base station, when the priority of said transmitting base station is higher than a new priority of the base station, which is obtained by reducing the priority of the base station by "1".

16. A mobile radio communication system according to claim 13, comprising means for designating at least one of said radio base stations as a synchronizing key station, wherein said at least one radio base station includes state altering means for altering said synchronization establishing information included in the control signal transmitted by the base station to a state indicating that synchronization has been established when the base station receives no control signal for a predetermined period of time during which the base station is in a synchronization non-established state.

17. A mobile radio communication system according to claim 16, wherein said at least one base station is designated as said synchronizing key station when said at least one base station is installed.

18. A mobile radio communication system according to claim 16, wherein said predetermined period of time is a time required for the base station to repeat a determination that the base station receives no radio control signal by a predetermined number of times.

19. A mobile radio communication system according to claim 13, comprising means for designating at least one of said radio base stations as a synchronizing key station, wherein said at least one base station includes means for reducing the priority of the base station by "1" thereby generating a new priority, means for increasing said new priority by "1" so as to return it to the original priority when the base station receives no control signal for a predetermined period of time, and state altering means for altering said synchronization establishing information included in the control signal transmitted by the base station to a state indicating a synchronization established state upon returning the new priority to the original priority.

20. A mobile radio communication system according to claim 13, wherein the synchronization establishing means of each of said radio base stations has correcting means for correcting a starting time for transmission of the radio control signal transmitted by the base station based on a propagation delay time of radiowave between the base station and the transmitting base station upon establishing synchronization with said transmitting base station.

21. A mobile radio communication system according to claim 20, wherein said propagation delay time is determined based on a size of a service zone covered by the base station.

22. A mobile radio communication system according to claim 20, wherein said propagation delay time is predetermined and stored in the base station.

23. A mobile radio communication system according to claim 20, wherein said propagation delay time is determined based on a time interval required for a radio wave to make one round transmission between the base station and the transmitting base station when repeatedly transmitting and receiving the radio wave at a predetermined time interval between them.

24. A mobile radio communication system according to claim 13, wherein each of said radio base stations has means for altering said synchronization establishing information included in the radio control signal transmitted from the base station to a synchronization non-established state before establishing synchronization in the base station which has not previously established synchronization.

25. A mobile radio communication system having a plurality of radio base stations, each of said radio base stations comprising: means for including, in a radio control signal transmitted by the base station, priority information indicating a priority of the base station relating to synchronization establishment and synchronization establishing information indicating whether the base station has established synchronization with another radio base station;

priority determining means for determining, when the base station has not established synchronization with any other one of the radio base stations, whether a comparison of the priority of the base station with the priority indicated by the priority information included in the radio control signal transmitted from another transmitting base station indicates that the base station is allowed to establish synchronization with the transmitting base station;

means operative, when the base station is allowed to establish synchronization with the transmitting base station, for establishing synchronization with said transmitting base station when the synchronization establishing information included in the radio control signal transmitted from the transmitting base station indicates that the transmitting base station has established synchronization; and means operative, when the base station has established synchronization with said transmitting base station, for making the priority of the base station the same as the priority of said transmitting base station and including the new priority information in said radio control signal.

26. A mobile radio communication system according to claim 25, wherein each of said radio base stations further includes means operative, when the base station is not in a synchronization state, and receives no control signal for a predetermined period of time from another radio base station, for changing the synchronization establishing information of the base station to a state indicating that synchronization has been established when the base station is designated as a key station for synchronization establishment, and maintaining the synchronization establishing information of the base station at the synchronization non-established state when the base station is not designated as the key station.

27. A mobile radio communication system according to claim 26, wherein the designation of the key station is made when installing the radio base station.

28. A mobile radio communication system according to claim 27, wherein, the designation of the key station can be altered by a higher rank station after installation of the radio base station.

29. A mobile radio communication system according to claim 25, wherein said radio control signal is a broadcast signal transmitted by each of the radio base stations toward a mobile station in a service zone of the radio base station.

30. A mobile radio communication system according to claim 29, wherein a transmitter identification code is included in said broadcast signal, and contents of the transmitter identification code are identified by each of the radio base stations when it receives said broadcast signal.

* * * * *